US008250386B2

(12) United States Patent
Graef

(10) Patent No.: US 8,250,386 B2
(45) Date of Patent: Aug. 21, 2012

(54) TURNING OFF BUFFER WHEN A DIGITAL BACK END OPERATES AT A SAME DATA RATE AS THE ANALOG FRONT END

(75) Inventor: Nils Graef, San Jose, CA (US)

(73) Assignee: Agere Systems Inc., Allentown, PA (US)

( * ) Notice: Subject to any disclaimer, the term of this patent is extended or adjusted under 35 U.S.C. 154(b) by 561 days.

(21) Appl. No.: 12/447,716

(22) PCT Filed: Mar. 27, 2008

(86) PCT No.: PCT/US2008/058448
§ 371 (c)(1),
(2), (4) Date: Apr. 29, 2009

(87) PCT Pub. No.: WO2009/120199
PCT Pub. Date: Oct. 1, 2009

(65) Prior Publication Data
US 2011/0060894 A1    Mar. 10, 2011

(51) Int. Cl.
*G06F 1/32* (2006.01)
*G06F 3/00* (2006.01)
*G06F 13/00* (2006.01)
(52) U.S. Cl. ........ 713/300; 320/322; 320/323; 320/324; 710/1; 710/14; 710/33; 710/310
(58) Field of Classification Search .................. 713/300, 713/320, 322, 323, 324; 710/1, 14, 33, 310
See application file for complete search history.

(56) References Cited

U.S. PATENT DOCUMENTS

| 5,083,266 | A |   | 1/1992 | Watanabe |
| 5,671,389 | A | * | 9/1997 | Saliba ........................... 711/111 |
| 5,854,720 | A |   | 12/1998 | Shrinkle et al. |
| 6,281,829 | B1 |   | 8/2001 | Amrany et al. |
| 6,424,688 | B1 |   | 7/2002 | Tan et al. |

(Continued)

FOREIGN PATENT DOCUMENTS
WO   PCT/US2008/058448   11/2008

OTHER PUBLICATIONS
US 5,455,812, 10/1995, Shinada (withdrawn)

*Primary Examiner* — Vincent T Tran
(74) *Attorney, Agent, or Firm* — Ryan, Mason & Lewis, LLP

(57) ABSTRACT

A processor circuit having reduced power consumption includes an analog front end operative to receive an analog signal supplied to the processor circuit and to generate a digital signal indicative of the analog signal. The processor further includes a digital back end operative to generate a digital output signal as a function of the digital signal generated by the analog front end. A buffer is coupled between the analog front end and the digital back end. In a first mode of operation, the digital back end operates at a substantially same data rate as the analog front end and the buffer is bypassed. In a second mode of operation, the digital back end operates at a higher data rate than the analog front end and the buffer is used to store outputs of the analog front end.

19 Claims, 2 Drawing Sheets

U.S. PATENT DOCUMENTS

| | | | |
|---|---|---|---|
| 7,073,079 B1 * | 7/2006 | Karsi et al. | 713/320 |
| 7,213,086 B2 * | 5/2007 | Wyatt et al. | 710/52 |
| 7,398,339 B1 * | 7/2008 | Davis et al. | 710/52 |
| 7,478,260 B2 * | 1/2009 | Spencer | 713/600 |
| 7,702,940 B2 * | 4/2010 | Van Gassel et al. | 713/324 |
| 2003/0189780 A1 * | 10/2003 | Asano et al. | 360/55 |
| 2007/0083685 A1 * | 4/2007 | Hsu et al. | 710/69 |
| 2009/0168939 A1 * | 7/2009 | Constantinidis et al. | 375/359 |

* cited by examiner

TURNING OFF BUFFER WHEN A DIGITAL BACK END OPERATES AT A SAME DATA RATE AS THE ANALOG FRONT END

FIELD OF THE INVENTION

The present invention relates generally to the electrical and electronic arts, and more particularly relates to signal processors.

BACKGROUND OF THE INVENTION

The use of signal processors, such as, for example, digital signal processors (DSPs), for supporting multiple data rates in certain applications is well known. Such applications may include, for example, read channels for hard disk drives supporting a wide range of data rates because the disk spins at a constant angular velocity, read channels for optical storage supporting multiple data rates (e.g., 1×, 2×, 4×, 8× read speeds), and Ethernet or wireless local area network (LAN) transceivers supporting multiple data rates (e.g., 10/100/1000/10000 megabits per second (Mb/s) for Gigabit Ethernet).

In many data processing circuits, the DSP is a primary source of power consumption in the circuits. For certain applications, particularly portable applications, reducing power consumption is critical. Conventional methodologies for reducing power consumption in a data processing circuit generally involve operating the DSP at a lower supply voltage for lower data rates. However, operating the DSP at a lower supply voltage has several disadvantages. For example, operating the DSP at a lower supply voltage for lower data rates requires the use of expensive voltage regulators. Furthermore, the amount by which the supply voltage can be reduced is limited by worst case transistor threshold voltage levels in the circuit (e.g., about 0.85 volt, depending on the integrated circuit process technology) and the amount of overdrive required in the circuit (the term "overdrive" generally refers to the level of gate voltage above the threshold voltage required for a given transistor device).

Accordingly, there exists a need for techniques for reducing power consumption in a DSP circuit which do not suffer from one or more of the above-described problems associated with conventional DSP circuitry.

SUMMARY OF THE INVENTION

Illustrative embodiments of the present invention meet the above-noted need by presenting techniques for beneficially reducing leakage power in a processor without significantly impacting performance and/or area. To accomplish this, embodiments of the invention provide a processor including an analog front end, a digital back end, and a buffer connected between the analog front end and digital back end. The digital back end is allowed to operate at the highest data rate of the analog front end. When the analog front end is operating at a lower data rate than the digital back end, data generated by the analog front end is stored in the buffer. While the buffer is filling, the digital back end is turned off to conserve power. When the buffer is full, the digital back end is turned on and data stored in the buffer is read at the higher data rate until the buffer is empty (or at least no longer full), at which point the digital back end is turned off again and the process is repeated. Since the digital back end is turned off for at least a portion of the time that data is being stored in the buffer, leakage power in the processor is advantageously reduced.

In accordance with one aspect of the invention, a processor having reduced power consumption includes an analog front end operative to receive an analog signal supplied to the processor and to generate a digital signal indicative of the analog signal. The processor further includes a digital back end operative to generate a digital output signal as a function of the digital signal generated by the analog front end. A buffer is coupled between the analog front end and the digital back end. In a first mode of operation, the digital back end operates at a substantially same data rate as the analog front end and the buffer is bypassed. In a second mode of operation, the digital back end operates at a higher data rate than the analog front end and the buffer is used to store outputs of the analog front end.

In accordance with another aspect of the invention, a method for reducing power consumption in a processor including an analog front end and a digital back end includes the steps of: detecting a data rate of the analog front end relative to a data rate of the digital back end; storing data associated with an output of the analog front end in a buffer in a first mode of operation corresponding to when the data rate of the analog front end is less than the data rate of the digital back end; and bypassing the buffer in a second mode of operation corresponding to when the data rate of the analog front end is substantially equal to the data rate of the digital back end.

In accordance with yet another aspect of the invention, an electronic system includes at least one integrated circuit comprising at least one processor having reduced power consumption. The processor includes an analog front end operative to receive an analog signal supplied to the processor and to generate a digital signal indicative of the analog signal, a digital back end operative to generate a digital output signal as a function of the digital signal generated by the analog front end, and a buffer coupled between the analog front end and the digital back end. In a first mode of operation, the digital back end operates at a substantially same data rate as the analog front end and the buffer is bypassed. In a second mode of operation, the digital back end operates at a higher data rate than the analog front end and the buffer is used to store outputs of the analog front end.

These and other features, aspects and advantages of the present invention will become apparent from the following detailed description of illustrative embodiments thereof, which is to be read in connection with the accompanying drawings.

DETAILED DESCRIPTION OF THE INVENTION

The present invention will be described herein in the context of an exemplary processor circuit, such as a DSP circuit, and an illustrative buffer circuit for use therein. It is to be understood, however, that the techniques of the present invention are not limited to the circuits shown and described herein. Rather, embodiments of the invention are directed to techniques for reducing power consumption in a processor circuit, without significantly impacting performance and/or area of the circuit. Although preferred embodiments of the invention may be fabricated in a silicon wafer, embodiments of the invention can alternatively be fabricated in wafers comprising other materials, including but not limited to gallium arsenide (GaAs), indium phosphide (InP), etc.

Figure 1:
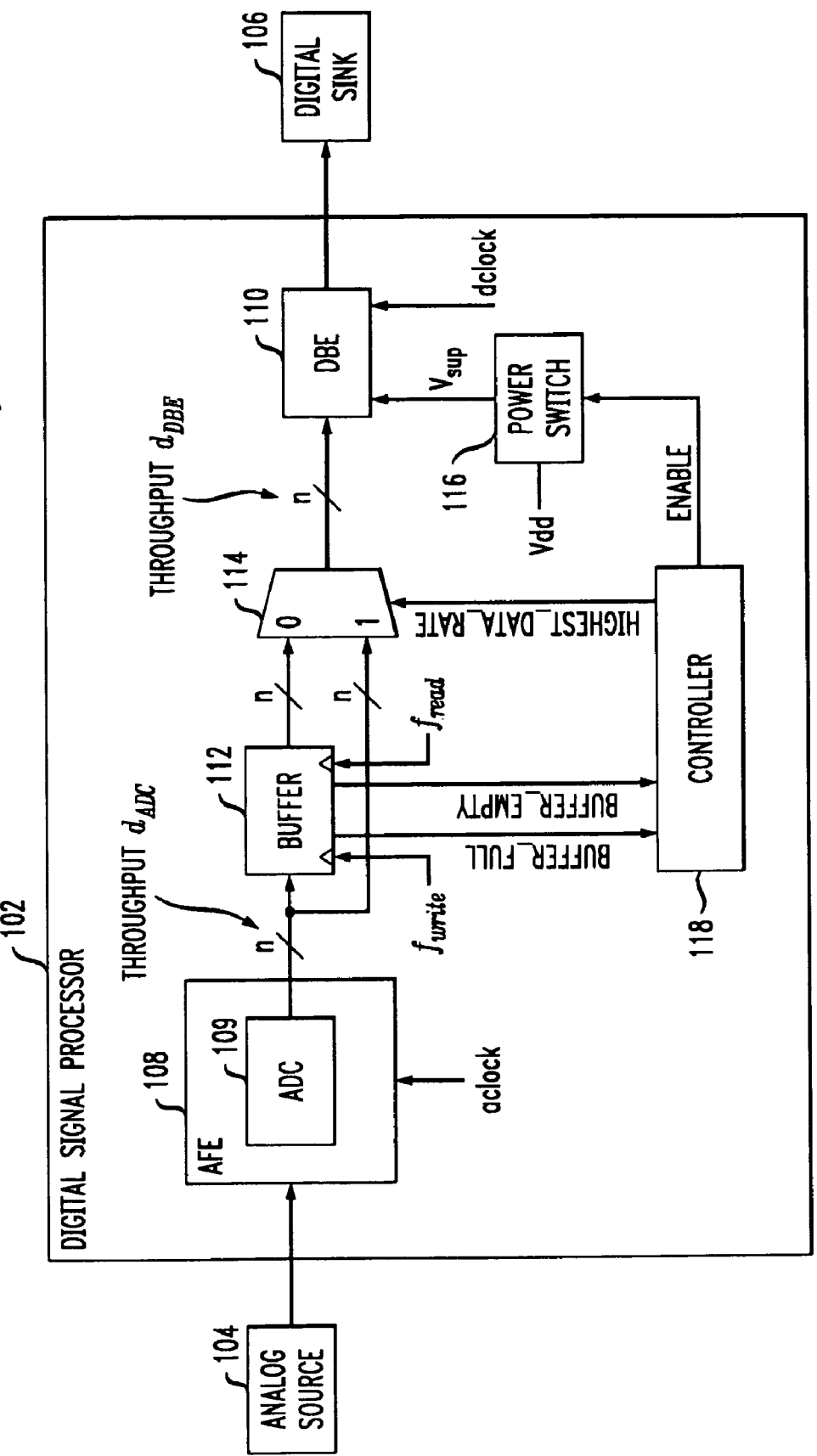
FIG. 1 is a block diagram depicting at least a portion of an exemplary processor circuit having reduced power consumption, formed in accordance with an embodiment of the present invention.

With reference to FIG. 1, a block diagram depicts at least a portion of an exemplary signal processing system 100 having reduced power consumption, in accordance with an embodiment of the present invention. The signal processing system 100 includes a DSP circuit 102, or alternative processor, coupled to an analog source 104 and a digital sink 106. The DSP circuit 102 is preferably operative to receive, as input, an analog signal from analog source 104 and to generate, as an output of the DSP circuit, a digital signal supplied to digital sink 106 which is a function of the analog signal.

As previously stated, certain applications may require the DSP circuit to support multiple data rates. A typical example of a multiple data rate application in which techniques of the invention may be beneficially employed is a read channel for a hard disk drive. More particularly, a read channel in a hard disk drive must support a wide range of data rates because, unlike a compact disk (CD) or digital versatile disk (DVD) drive, a hard disk drive spins at a constant angular velocity and therefore a higher read frequency is required for accessing outer tracks than for accessing inner tracks. Conventional methodologies for reducing power consumption in the DSP circuit have often involved lowering a supply voltage to the circuit. However, this approach can negatively impact performance and/or reliability of the DSP system and is therefore undesirable. Moreover, the amount by which supply voltage can be lowered in the DSP circuit is generally limited by worst-case transistor threshold voltage requirements of the circuit.

In order to reduce power consumption in DSP circuit 102 without significantly impacting performance, the DSP circuit includes an analog front end (AFE) 108, a digital back end (DBE) 110 and a buffer 112, or an alternative storage element, connected between the analog front end and the digital back end. The term "analog front end" as used herein is intended to broadly refer to circuitry that is operative to interface between the analog source 104 and the DSP circuit 102. Likewise, the term "digital back end" as used herein is intended to broadly refer to circuitry that is operative to interface between the DSP circuit 102 and the digital sink 106. At least a portion of the analog front end 108 and digital back end 110 resides in the DSP circuit 102.

Analog front end 108 preferably includes an analog-to-digital converter (ADC) 109, or alternative data conversion circuitry, and may include other circuitry (e.g., sample-and-hold circuit, voltage references, comparators, etc.) relating thereto (not explicitly shown), as will become apparent to those skilled in the art. ADC 109 is operative to receive the analog input signal supplied by analog source 104 and to generate a digital signal indicative of the analog signal. The digital signal generated by the ADC 109 may comprise, for example, a digital word representative of the analog input signal. Digital back end 110 is preferably operative to generate the digital output signal of DSP circuit 102 as a function of the digital signal generated by ADC 109 in the analog front end 108.

The analog front end 108 is preferably adapted for operating at multiple data rates. A clock signal, aclock, supplied to the analog front end 108 may vary between a minimum clock frequency, $f^{min}$, corresponding to a prescribed lowest data rate of the analog front end, and a maximum clock frequency, $f_{max}$, corresponding to a prescribed highest data rate of the analog front end. In the context of a read channel for a hard disk drive, for example, the analog front end 108 may operate at the lowest data rate when accessing inner tracks of the hard disk and may operate at the highest data rate when accessing outer tracks of the hard disk. The digital back end 110 preferably operates at a substantially constant data rate that is at least equal to (e.g., equal to or greater than) the highest data rate of the analog front end 108. Accordingly, in an embodiment of the invention, digital back end 110 receives a clock signal, dclock, at least equal to the maximum clock frequency $f_{max}$ of the analog front end 108. In this manner, the digital back end 110 is able to process data at the highest throughput of the analog front end 108.

When digital back end 110 is running at a higher data rate relative to analog front end 108, as may occur, for example, when the DSP circuit 102 is accessing inner tracks on a hard disk, buffer 112 is employed for operatively matching the two data rates, as will be described in further detail below. In this regard, buffer 112 is capable of supporting different read and write data rates, as evidenced by the two separate clock inputs for receiving read and write clock signals, $f_{read}$ and $f_{write}$, respectively. In an illustrative embodiment of the invention, the write clock $f_{write}$ supplied to buffer 112 is the same as clock signal aclock supplied to analog front end 108, and read clock $f_{read}$ supplied to the buffer is the same as clock signal dclock supplied to digital back end 110. When digital back end 110 is running at substantially the same data rate as analog front end 108, as may occur, for example, when accessing outer tracks on the hard disk, the digital back end is processing data as fast as the analog front end is generating the data, and therefore buffer 112 is essentially not needed. Thus, DSP circuit 102 is preferably operative in one of at least two modes.

In a first mode of operation, which may be a high data rate mode, buffer 112 is bypassed and digital back end 110 receives data directly from analog front end 108 as it is being generated. In this first mode, a data throughput of ADC 109, $d_{ADC}$, is substantially equal to a data throughput of digital back end 110, $d_{DBE}$. When bypassed, buffer 112 can be turned off to conserve power. In a second mode of operation, which may be a low data rate mode, the data throughput of digital back end 110 is greater than the data throughput of the ADC 109 in analog front end 108 (i.e., $d_{DBE} > d_{ADC}$). In this second mode, data generated by analog front end 108 is stored in buffer 112. As buffer 112 is being filled, digital back end 110 is preferably turned off to conserve power. Once buffer 112 is full, digital back end 110 is turned on and begins reading data from the buffer at the higher data rate. When buffer 112 is empty (since the digital back end is able to read from the buffer faster than the analog front end can write to the buffer in this scenario), or at least when the buffer content is below a prescribed threshold such that the buffer is no longer full, digital back end 110 is turned off again and the process is repeated.

Using the inventive methodology described herein, static power, including, for example, leakage power, is advantageously conserved in the DSP circuit 102 primarily because the digital back end 110 is turned on for a shorter period of time compared to if the digital back end was to remain on and running at the same data rate as the analog front end 108. By way of illustration only, for a DSP circuit supporting data rates of 1×, 2× and 4×, a savings of up to about 50 percent lower static power for 2× mode and up to about 75 percent lower static power for 1× mode are achievable relative to 4× mode where the digital back end is running at essentially the same data rate as the analog front end. As an added benefit, techniques of the invention provide lower latency (and thus higher performance) for lower data rate modes. This is primarily because the digital back end, running at the highest data rate, is operative to process and transfer data faster than if the data rate of the digital back end was matched to the lower data rate of the analog front end operating in one of the lower data rate modes (e.g., 1× or 2× mode).

DSP circuit 102 further includes a multiplexer 114 connected between buffer 112 and digital back end 110, a power switch 116, or alternative switching circuitry, connected to the digital back end, and a controller 118. As apparent from the figure, the output of ADC 109 in analog front end 108 comprises an n-bit wide bus, where n is an integer greater than zero, and thus the signal path through DSP circuit 102 between the analog front end and the digital back end 110 would also be n bits wide. Although depicted as a single block, buffer 112 is preferably n bits wide corresponding to the width of the output data path of ADC 109. Likewise, multiplexer 114 may include n multiplexer circuits, each multiplexer circuit corresponding to a given one of the output bits from the ADC 109. For economy of description, however, the data path in the DSP circuit 102 may be treated as a single path (e.g., n=1).

A first input (0) of multiplexer 114 is connected to an output of buffer 112, a second input (1) of the multiplexer is connected to the output of the analog front end 108, and an output of the multiplexer is connected to an input of the digital back end 110. Multiplexer 114 is operative to select, as an input source, either buffer 112 or ADC 109 to be provided as an output to digital back end 110 as a function of a control signal, highest_data_rate, presented to the multiplexer. For example, when the signal highest_data_rate is a logic low level ("0"), which may be ground (e.g., zero volts), the first input of multiplexer 114 is selected as the output. When signal highest_data_rate is a logic high level ("1"), which may be a positive supply voltage (e.g., VDD) indicative of analog front end 108 running at the highest prescribed data rate, the second input of the multiplexer is selected as the output, thereby bypassing buffer 112. Control signal highest_data_rate is preferably generated by controller 118, as shown. In this instance, controller 118 may be operative to determine the data rate of the analog front end 108, such as, for example, by detecting the frequency of clock signal aclock supplied to the analog front end. Alternatively, the highest_data_rate signal may be supplied by another functional block either within DSP circuit 102 or external to the DSP circuit.

Buffer 112 is preferably adapted to generate a first control signal, buffer_full, indicating whether or not the buffer content has exceeded a prescribed threshold. For example, buffer_full may be a logic high level indicative of buffer 112 being full, and may be a logic low level indicative of the buffer not being full. Buffer 112 may optionally generate a second control signal, buffer_empty, indicating whether or not the buffer is empty. For example, buffer_empty may be a logic high level indicative of buffer 112 being empty, and may be a logic low level indicative of the buffer not being empty. Controller 118 is preferably operative to receive control signals buffer_full and buffer_empty and to generate a third control signal, enable, as a function of the buffer_full and buffer_empty control signals.

Control signal enable generated by controller 118 is used to selectively turn on digital back end 110 via power switch 116. More particularly, power switch 116 is operative to selectively connect a supply voltage source, which may be Vdd, to digital back end 110 as a function of signal enable. Various implementations of power switch 116 are contemplated by the invention. For example, in an illustrative embodiment, power switch 116 may comprise an n-channel metal-oxide-semiconductor (NMOS) transistor device (not explicitly shown) including a drain coupled to a power supply connection, $V_{sup}$, of digital back end 110, a source coupled to a supply return of the DSP circuit, which may be Vss, and a gate adapted to receive the signal enable from controller 118. When enable is a logic high level, the NMOS device turns on and connects digital back end 110 to Vss, thereby turning on the digital back end. In another illustrative embodiment, power switch 116 may comprise a p-channel metal-oxide-semiconductor (PMOS) transistor device (not explicitly shown) including a drain coupled to a power supply connection, $V_{sup}$, of digital back end 110, a source coupled to a voltage supply source of the DSP circuit, which may be Vdd, and a gate adapted to receive the signal enable from controller 118. When enable is a logic low level, the PMOS device turns on and connects digital back end 110 to Vdd, thereby turning on the digital back end.

In yet another embodiment, power switch 116 may comprise a programmable voltage source (not explicitly shown) operative to generate an output voltage having a magnitude which is controllable as a function of the signal enable. Thus, when enable is a first level (e.g., logic high), power switch 116 is operative to supply a first voltage (e.g., Vdd) to digital back end 110, and when enable is a second level (e.g., logic low), the power switch is operative to supply a second voltage (e.g., zero volts) to the digital back end to thereby power down the digital back end. Regardless of the manner in which power switch 116 is implemented, the power switch functions primarily to beneficially turn off digital back end 110 when the digital back end is not needed, thereby reducing static power consumption in DSP circuit 102.

Figure 2:
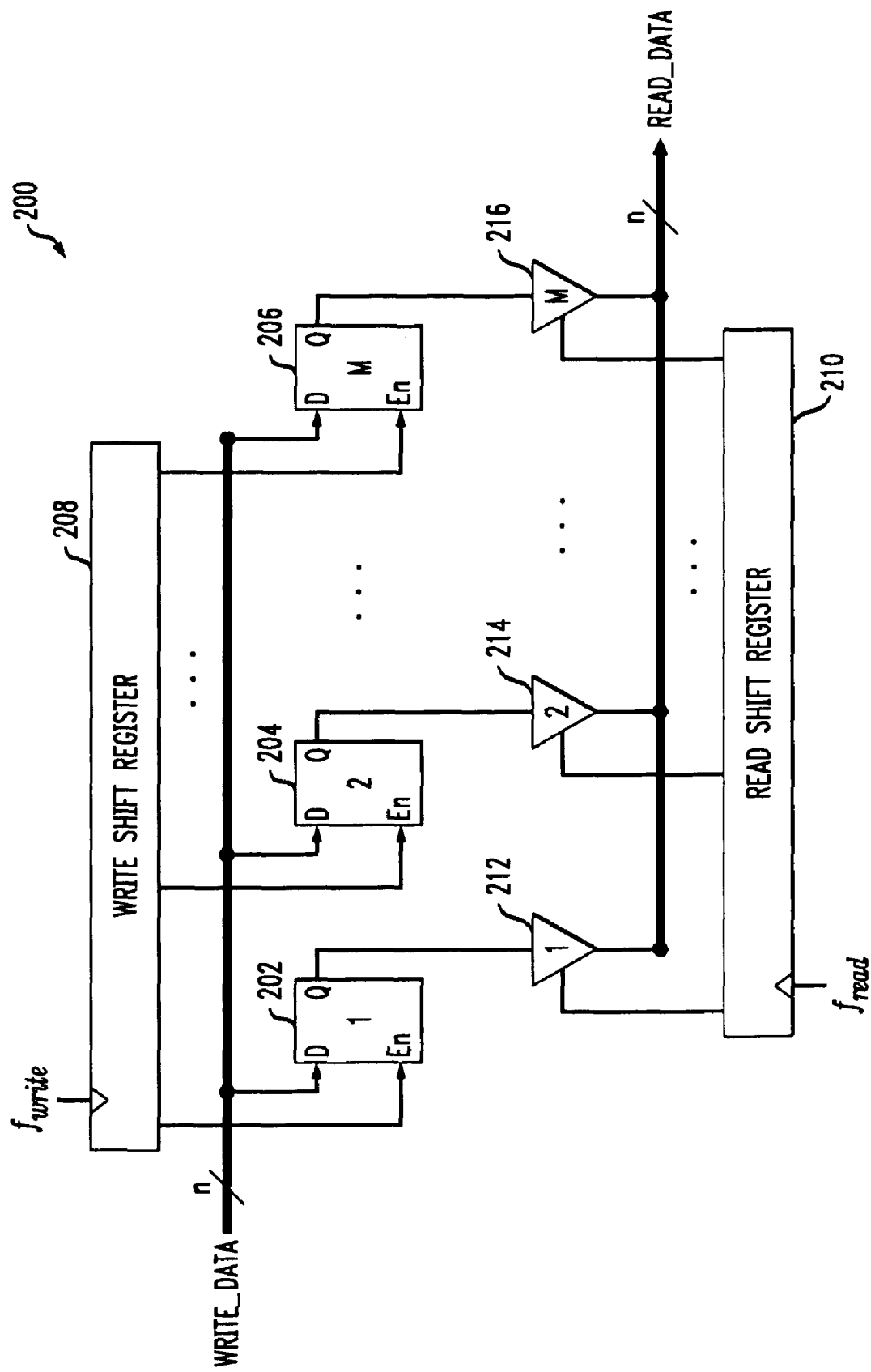
FIG. 2 is a schematic diagram depicting at least a portion of an exemplary buffer circuit that can be employed in the processor circuit of FIG. 1, in accordance with an embodiment of the present invention.

FIG. 2 is a schematic diagram depicting at least a portion of an exemplary buffer circuit 200 that can be employed in the illustrative DSP circuit 102 of FIG. 1, in accordance with an embodiment of the present invention. Buffer circuit 200 includes a plurality of latch stages 202, 204 and 206, although alternative storage elements may be employed, such as, for example, memory cells, in which case buffer circuit 200 may comprise a memory array (e.g., multiple-port memory). There are M latch stages shown, where M may be any integer greater than one, with the number of latch stages M corresponding to a depth of buffer circuit 200. Each latch stage 202, 204, 206 is preferably n bits wide corresponding to the width of the data path of the DSP circuit in which buffer circuit 200 may be employed. It is to be understood that the invention is not limited to any particular number of latch stages in buffer circuit 200. Each of the latch stages 202, 204 and 206 may comprise a D-type flip-flop (DFF) including a data input (D), a clock input (En) and a data output (Q). Input data to be stored in the respective latch stages 202, 204, 206 is supplied to the buffer circuit 200 by an n-bit write data bus. Similarly, output data to be read from the buffer circuit 200 is provided by an n-bit read_data bus.

As previously explained, buffer circuit 200 is operative to support different read and write data rates. To accomplish this, buffer circuit 200 includes a write shift register 208 and a read shift register 210, each clocked by its own distinct clock signal, $f_{write}$ and $f_{read}$, respectively. Clock signal $f_{write}$ supplied to write shift register 208 is preferably the same as, or proportionally related to, the data rate of the analog front end (108 in FIG. 1). Clock signal $f_{read}$ supplied to read shift register 210 is preferably the same as, or proportionally related to, the data rate of the digital back end (110 in FIG. 1). For example, in an illustrative embodiment of the invention, $f_{write}$ is substantially equal to $d_{ADC}$, and $f_{read}$ is substantially equal to $d_{DBE}$. The data rate of the digital back end is preferably equal to or greater than the data rate of the analog front end, depending on the mode of operation of the DSP circuit, and thus $f_{read} \geq f_{write}$. Clock signal $f_{write}$ may be the same as the clock signal (e.g., aclock) supplied to the analog front end (see FIG. 1). Likewise, clock signal $f_{read}$ may be the same as the clock signal (e.g., dclock) supplied to the digital back end (see FIG. 1). These clock signals may be generated, for example, by controller 118 shown in FIG. 1. Write shift register 208 is operative to control the clock inputs of the respective latch stages 202, 204, 206. Read shift register 210 is operative to control enable inputs of a plurality of tri-state buffers 212, 214 and 216. Each tri-state buffer is connected to a corresponding one of the latch stages. Specifically, each of the tri-state buffers 212, 214, 216 includes an input connected to the output of a corresponding one of the latch stages 202, 204, 206, respectively, and an output connected to the read_ data bus. The tri-state buffers 212, 214, 216 are operative in one of at least two modes as a function of the control signals supplied to their respective enable inputs. In a first mode (e.g., enabled or active mode), a given tri-state buffer is operative to generate an output signal which is indicative of the input signal presented to the given tri-state buffer. In a second mode (e.g., disabled or inactive mode), the given tri-state buffer is operative in a high-impedance state wherein the output of the given tri-state buffer essentially floats and is therefore undefined. Although depicted as non-inverting, tri-state buffers 212, 214, 216 may alternatively be inverting, such that the output signal generated by a given tri-state buffer is a logical complement of the input signal supplied thereto. This may be beneficial in certain applications in which it is desirable to invert the logic level of the digital signal generated by the analog front end.

It is to be appreciated that while buffer circuit 200 may represent one exemplary implementation of buffer 112 shown in FIG. 1, the invention is not limited to this particular buffer circuit arrangement. Rather, alternative buffer circuit arrangements may be similarly employed in the DSP circuit, as will become apparent to those skilled in the art given the teachings herein.

By way of example only and without loss of generality, an operation of buffer circuit 200 will now be described. For purposes of this illustrative description, it is assumed that the DSP circuit utilizes a 6-bit wide signal path (e.g., n=6). It is to be appreciated that techniques of the invention may be extended to a buffer circuit having a signal path any number of bits wide. At the beginning of the processing of a sector or packet of data (e.g., in a read channel context), both the write shift register 208 and read shift register 210 are preferably initialized with data 1, 0, . . . 0. Thereafter, for each clock cycle of $f_{write}$, the write shift register 208 rotates its contents to enable the next latch stage for writing data thereto. Read shift register 210 functions in a similar manner, except that it is clocked by the higher frequency $f_{read}$. Note, that in FIG. 2, $f_{read}$ is preferably equal to $d_{DBE}$ (both $f_{read}$ and $d_{DBE}$ have the same dimension, which is 1/second, e.g., 1 GHz=1 Giga-samples per second), and $f_{write}$ is preferably equal to $d_{ADC}$. In more general cases, the analog front end, the digital back end and/or the buffer could process more than one sample per clock cycle in parallel (e.g., 2 samples per clock cycle, in which case $2 \cdot f_{read} = d_{DBE}$ and $2 \cdot f_{write} = d_{ADC}$).

As previously stated, the width of the buffer circuit 200 is determined by the bit-width of the ADC output (e.g., 6 bits in the above example). A depth of the buffer circuit 200 is determined as a function of the number of samples, s, per hard disk sector or packet and a ratio, $f_{write}/f_{read}$. More particularly, a minimum required depth of the buffer circuit 200 may be determined by the following expression:

$$\text{minimum\_depth} = s \cdot \left(1 - \frac{f_{write\_min}}{f_{read\_max}}\right),$$

where $f_{read\_max}$ is the maximum clock frequency of the read shift register and $f_{write\_min}$ is the minimum clock frequency of the write shift register. For example, if $f_{write\_min}$ is 50 percent smaller than $f_{read\_max}$, or equivalently, if $d_{ADC}$ is 50 percent smaller than $d_{DBE}$, then the required depth of the buffer circuit is 0.5s. Thus for s=1000 samples, the minimum required buffer depth would be 500.

At least a portion of the circuits and methodologies of the present invention may be implemented in one or more integrated circuits. In an illustrative embodiment, for example, an integrated circuit includes at least one embedded processor operative to implement techniques of the invention described herein. In forming integrated circuits, die are typically fabricated in a repeated pattern on a surface of a semiconductor wafer. Each of the die includes a device described herein, and may include other structures or circuits. Individual die are cut or diced from the wafer, then packaged as integrated circuits. One skilled in the art would know how to dice wafers and package die to produce integrated circuits. Integrated circuits so manufactured are considered part of this invention.

An integrated circuit in accordance with the present invention can be employed in various applications and/or electronic systems which utilize a processor, embedded or otherwise. Suitable systems for implementing techniques of the invention may include, but are not limited to, personal computers, communication networks, interface networks, etc. Systems incorporating such integrated circuits are considered part of this invention. Given the teachings of the invention provided herein, one of ordinary skill in the art will be able to contemplate other implementations and applications of the techniques of the present invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A processor having reduced power consumption, comprising:
    an analog front end operative to receive an analog signal supplied to the processor and to generate a digital signal indicative of the analog signal;
    a digital back end operative to generate a digital output signal as a function of the digital signal generated by the analog front end;
    a buffer coupled between the analog front end and the digital back end; and
    a controller coupled to the buffer and operative to turn on at least a portion of the digital back end when the buffer is full and to turn off at least the portion of the digital back end when a content of the buffer is below a prescribed threshold where the buffer is not full;
    wherein in a first mode of operation, the digital back end operates at a substantially same data rate as the analog front end and the buffer is bypassed, and in a second mode of operation, the digital back end operates at a higher data rate than the analog front end and the buffer is used to store outputs of the analog front end.

2. The processor of claim 1, wherein the controller is operative to turn off at least the portion of the digital back end when the buffer is empty.

3. The processor of claim 1, wherein the controller is operative to determine the data rate of the analog front end and to generate a first control signal for placing the processor in the first mode when the analog front end is operating at a first data rate and for placing the processor in the second mode when the analog front end is operating at a second data rate, the first data rate being higher than the second data rate.

4. The processor of claim 1, further comprising a multiplexer coupled between the buffer and the digital back end, the multiplexer being operative to bypass the buffer in the first mode as a function of a second control signal.

5. The processor of claim 1, wherein the buffer is configured having a read data rate that is higher than a write data rate.

6. The processor of claim 1, wherein the buffer comprises a memory array, the memory array being configured having different read and write data rates.

7. The processor of claim 1, wherein the processor comprises a digital signal processor.

8. The processor of claim 1, wherein the analog front end comprises an analog-to-digital converter operative to receive the analog signal supplied to the processor and to generate a digital word representative of the analog signal.

9. The processor of claim 8, wherein a width of a signal path between the analog front end and the digital back end is at least equal to a number of bits in the digital word generated by the analog-to-digital converter.

10. A processor having reduced power consumption, comprising:
an analog front end operative to receive signal supplied to the processor and to generate a digital signal indicative of the analog signal;
a digital back end operative to generate a digital output signal as a function of the digital signal generated by the analog front end;
a buffer coupled between the analog front end and the digital back end; and
switching circuitry coupled to the digital back end, the switching circuitry being operative to selectively turn on and turn off at least a portion of the digital back end as a function of a first control signal;
wherein in a first mode of operation, the digital back end operates at a substantially same data rate as the analog front end and the buffer is bypassed, and in a second mode of operation, the digital back end operates at a higher data rate than the analog front end and the buffer is used to store outputs of the analog front end.

11. The processor of claim 10, wherein the first control signal is operative to turn on at least the portion of the digital back end when the buffer is full and to turn off at least the portion of the digital back end when a content of the buffer is below a prescribed threshold where the buffer is not full.

12. The processor of claim 10, wherein the switching circuitry comprises a programmable voltage source operative to selectively control a level of voltage supplied to at least the portion of the digital back end as a function of the first control signal.

13. The processor of claim 10, wherein the switching circuitry is coupled between the digital back end and a voltage supply source of at least the portion of the digital back end, the switching circuitry being operative to selectively disconnect at least the portion of the digital back end from the voltage supply source as a function of the first control signal.

14. A processor having reduced power consumption, comprising:
an analog front end operative to receive an analog signal supplied to the processor and to generate a digital signal indicative of the analog signal;
a digital back end operative to generate a digital output signal as a function of the digital signal generated by the analog front end; and
a buffer, coupled between the analog front end and the digital back end, comprising:
a plurality of latch stages, each of the latch stages including a clock input, a data input and a data output, the respective data inputs of the plurality of latch stages forming an input of the buffer;
a plurality of tri-state buffers, each of the tri-state buffers including an input connected to the output of a corresponding one of the latch stages, a control input, and an output, the respective output of the plurality of tri-state buffers forming an output of the buffer;
a first shift register connected to the plurality of latch stages, the first shift register being clocked with a first clock signal and operative to generate a plurality of clock signals supplied to the respective clock inputs of the plurality of latch stages; and
a second shift register connected to the plurality of tri-state buffers, the second shift register being clocked with a second clock signal and operative to generate a plurality of enable signals supplied to the respective control inputs of the plurality of tri-state buffers;
wherein in a first mode of operation, the digital back end operates at a substantially same data rate as the analog front end and the buffer is bypassed, and in a second mode of operation, the digital back end operates at a higher data rate than the analog front end and the buffer is used to store outputs of the analog front end.

15. A method for reducing power consumption in a processor including an analog front end and a digital back end, the method comprising the steps of:
detecting a data rate of the analog front end relative to a data rate of the digital back end;
storing data associated with an output of the analog front end in a buffer in a first mode of operation corresponding to when the data rate of the analog front end is less than the data rate of the digital back end;
bypassing the buffer in a second mode of operation corresponding to when the data rate of the analog front end is substantially equal to the data rate of the digital back end;
in the first mode, turning on at least a portion of the digital back end when the buffer is full; and
in the first mode, turning off at least the portion of the digital back end when a content of the buffer is below a prescribed threshold where the buffer is not full.

16. An integrated circuit including at least one processor having reduced power consumption, the at least one processor comprising:
an analog front end operative to receive an analog signal supplied to the at least one processor and to generate a digital signal indicative of the analog signal;
a digital back end operative to generate a digital output signal as a function of the digital signal generated by the analog front end;
a buffer coupled between the analog front end and the digital back end; and
a controller coupled to the buffer and operative to turn on at least a portion of the digital back end when the buffer is full and to turn off at least the portion of the digital back end when a content of the buffer is below a prescribed threshold where the buffer is not full;

wherein in a first mode of operation, the digital back end operates at a substantially same data rate as the analog front end and the buffer is bypassed, and in a second mode of operation, the digital back end operates at a higher data rate than the analog front end and the buffer is used to store outputs of the analog front end.

17. The integrated circuit of claim 16, wherein the at least one processor is an embedded processor.

18. An integrated circuit including at least one processor having reduced power consumption, the at least one processor comprising:
  an analog front end operative to receive an analog signal supplied to the at least one processor and to generate a digital signal indicative of the analog signal;
  a digital back end operative to generate a digital output signal as a function of the digital signal generated by the analog front end;
  a buffer coupled between the analog front end and the digital back end; and
  switching circuitry coupled to the digital back end, the switching circuitry being operative to selectively turn on and turn off the digital back end as a function of a first control signal;
  wherein in a first mode of operation, the digital back end operates at a substantially same data rate as the analog front end and the buffer is bypassed, and in a second mode of operation, the digital back end operates at a higher data rate than the analog front end and the buffer is used to store outputs of the analog front end.

19. An electronic system, comprising:
  at least one integrated circuit including at least one processor having reduced power consumption, the at least one processor comprising:
  an analog front end operative to receive an analog signal supplied to the processor and to generate a digital signal indicative of the analog signal;
  a digital back end operative to generate a digital output signal as a function of the digital signal generated by the analog front end;
  a buffer coupled between the analog front end and the digital back end; and
  a controller coupled to the buffer and operative to turn on at least a portion of the digital back end when the buffer is full and to turn off at least the portion of the digital back end when a content of the buffer is below a prescribed threshold where the buffer is not full;
  wherein in a first mode of operation, the digital back end operates at a substantially same data rate as the analog front end and the buffer is bypassed, and in a second mode of operation, the digital back end operates at a higher data rate than the analog front end and the buffer is used to store outputs of the analog front end.

* * * * *